(12) United States Patent
Lin et al.

(10) Patent No.: US 11,677,314 B2
(45) Date of Patent: Jun. 13, 2023

(54) CONTROL CIRCUIT FOR BRIDGE MOSFETS

(71) Applicant: HEWLETT PACKARD ENTERPRISE DEVELOPMENT LP, Houston, TX (US)

(72) Inventors: Gary Lin, Houston, TX (US); Chung-Ping Ku, Houston, TX (US); Nowa Wang, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/511,422

(22) Filed: Oct. 26, 2021

(65) Prior Publication Data

US 2023/0127621 A1    Apr. 27, 2023

(51) Int. Cl.
*H02M 7/219*    (2006.01)
*H02M 1/42*    (2007.01)
*H02M 3/158*    (2006.01)

(52) U.S. Cl.
CPC ....... *H02M 1/4225* (2013.01); *H02M 1/4233* (2013.01); *H02M 3/1582* (2013.01); *H02M 7/219* (2013.01)

(58) Field of Classification Search
CPC ........ H02M 1/0029; H02M 1/12; H02M 1/14; H02M 1/42; H02M 1/4208; H02M 1/4225; H02M 1/4233; H02M 1/4241; H02M 1/4258; H02M 7/12; H02M 7/155; H02M 7/1555; H02M 7/162; H02M 7/1623; H02M 7/21; H02M 7/217; H02M 7/219; H02M 3/158; H02M 3/1582
See application file for complete search history.

(56) References Cited

U.S. PATENT DOCUMENTS

| 6,891,739 B2 | 5/2005 | Nadd et al. |
| 7,446,513 B2 | 11/2008 | Dikken et al. |
| 9,007,102 B2 | 4/2015 | Lobsiger et al. |
| 9,966,944 B2 | 5/2018 | Rossi et al. |

(Continued)

OTHER PUBLICATIONS

Alessandro Soldati; Davide Barater; Francesco Brugnano; Carlo Concari; "Design of a control unit for advanced gate drivers featuring adaptive dead-time and diagnostics"; Jan. 28, 2016; IEEE; IECON 2015—41st Annual Conference of the IEEE Industrial Electronics Society (Year: 2016).*

(Continued)

*Primary Examiner* — Thienvu V Tran
*Assistant Examiner* — Shahzeb K Ahmad
(74) *Attorney, Agent, or Firm* — Nolte Lackenbach Siegel (57) ABSTRACT

A control circuit for a plurality of metal-oxide semiconductor field-effect transistors (MOSFETs) in a bridge circuit for rectifying an alternating current (AC) input to generate a direct-current (DC) output includes first and second high side controls and first and second low side controls for providing gate voltage signals to respective MOSFETs in the bridge circuit. Dead time controls are provided for establishing dead time intervals between activation of complementary MOSFETs in the bridge circuit. The low side controls provide gate voltage signals having sloped edges and the dead time controls include Zener diodes having reverse bias thresholds for determining the duration of the dead time intervals.

20 Claims, 8 Drawing Sheets

(56) References Cited

U.S. PATENT DOCUMENTS

| | | | | |
|---|---|---|---|---|
| 10,637,348 B1* | 4/2020 | Wu | ............... | H03K 17/6871 |
| 2008/0049471 A1* | 2/2008 | Ribarich | ............... | H03K 17/28 |
| | | | | 363/80 |
| 2011/0199799 A1* | 8/2011 | Hui | ............... | H02M 7/06 |
| | | | | 363/127 |
| 2019/0296728 A1* | 9/2019 | Song | ............... | H03K 17/163 |
| 2020/0382016 A1* | 12/2020 | Wen | ............... | H02M 7/2195 |
| 2022/0239223 A1* | 7/2022 | Liao | ............... | H02M 1/385 |
| 2022/0393574 A1* | 12/2022 | Pervaiz | ............... | H02M 1/083 |

OTHER PUBLICATIONS

Yan-Fei Liu; Lusheng Ge; Shicheng Zheng; "Dual channel current-source gate drivers for high-frequency dc-dc converters"; Aug. 1, 2008; IEEE; 2008 3rd IEEE Conference on Industrial Electronics and Applications (Year: 2008).*

Alpha & Omega Semiconductor, "AOZ7200CI, 600V—AlphaZBL," Data Sheet, Rev. 1.0, Oct. 2020, 9 pages, http://www.aosmd.com/res/data_sheets/AOZ7200CI.pdf.

NXP Semiconductors, "TEA2208T, Active Bridge Rectifier Controller," Rev. 1.2, Product Data Sheet, Oct. 29, 2020, 17 pages, https://www.nxp.com/docs/en/data-sheet/TEA2209T.pdf.

Tolstoy, G. et al., "An Experimental Analysis on How the Dead-time of SiC BJT and SiC MOSFET Impacts the Losses in a High-frequency Resonant Converter," 16th European Conference on Power Electronics and Applications, Aug. 26-28, 2014, https://ieeexplore.ieee.org/stamp/stamp.jsp?tp=&arnumber=6911042.

* cited by examiner

CONTROL CIRCUIT FOR BRIDGE MOSFETS

BACKGROUND

A power supply unit (PSU) for a computing device may include a bridge circuit for rectifying an alternating current (AC) input to produce a direct current (DC) output. The DC output may be provided to a power factor correction (PFC) boost circuit to provide DC power to a downstream load.

A PSU bridge circuit may include a plurality of metal-oxide semiconductor field-effect transistors (MOSFETs) which are alternately switched on and off with gate voltages to perform active full-wave rectification of the AC input. A control circuit may be provided for generating the gate voltages and establishing the switch timing of the bridge MOSFETs.

BRIEF DESCRIPTION OF THE DRAWINGS

The present disclosure is best understood from the following detailed description when read with the accompanying figures, wherein.

It is emphasized that, in accordance with the standard practice in the industry, various features are not drawn to scale. In fact, the dimensions of the various features may be arbitrarily increased or reduced for clarity of discussion or illustration.

DETAILED DESCRIPTION

Illustrative examples of the subject matter claimed below are disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As used herein, to "provide" an item means to have possession of and/or control over the item. This may include, for example, forming (or assembling) some or all of the item from its constituent materials and/or, obtaining possession of and/or control over an already-formed item.

As described herein, a MOSFET transistor may be referred to as being switched "on" or "off," or, alternatively, "activated" or "deactivated" according to assertion or de-assertion of a gate signal applied to its gate terminal. A MOSFET, when "on," or "activated," conducts a current between its source and drain terminals. i.e., is rendered conductive, according to and in proportion to the voltage level of a gate voltage applied to its gate terminal. For an N-type MOSFET, a positive gate signal voltage applied to the gate terminal "activates" or turns the MOSFET "on," while for a P-type MOSFET, a zero (ground) gate signal voltage "activates" or turns the MOSFET "on."

Similarly, as described herein, a bipolar junction transistor (BJT) may be referred to as being switched "on" or "off," or alternatively, "activated" or "deactivated," according to assertion or de-assertion of a base signal applied to its base terminal. A BJT, when "on," or "activated," conducts current between its collector terminal and its emitter terminal, i.e., is rendered conductive, according to and in proportion to the voltage level of the base signal voltage applied to its base terminal. For an N-type BJT, a positive base signal voltage applied to its base terminal "activates," or turns the BJT "on," while for a P-type BJT, a zero (ground) base signal voltage applied to its base terminal turns the BJT "on."

Unless otherwise noted, "assertion" of a gate signal voltage or a base signal voltage refers application of a gate voltage or a base voltage which causes a transistor to turn on, i.e., to "activate" the transistor to render the transistor conductive across its source-to-drain or current-to-emitter path.

In examples herein, a MOSFET bridge circuit includes a plurality of switched bridge MOSFETs controlled by a bridge MOSFET control circuit. The plurality of switched bridge MOSFETs may include a pair of high side bridge MOSFETs Q3 and Q4, and a pair of low side bridge MOSFETs Q1 and Q2. The bridge MOSFET control circuit may alternately turn on or activate pairs of the high and low side bridge MOSFETs (e.g., Q2/Q3 or Q1/Q4) with gate signal voltages to rectify an AC input to produce a DC output. The DC output may be provided to a load, such as a power factor control (PFC) boost circuit.

In examples, high side control circuits may control the switching of a pair of high side bridge MOSFETs and low side control circuits may control the switching of a pair of low side bridge MOSFETs. The gate signal voltages to the low side bridge MOSFETs may be referenced to the AC input, resulting in sloped rising and falling edges of the low side MOSFET gate voltages. High-low side interlock circuitry may be provided to prevent short circuiting between the high side and low side of the bridge circuit.

Further, a dead time control circuit may be provided to allow for establishing and adjusting a "dead time" interval between switching cycles of the high and low side bridge MOSFETs. As used herein, the term "dead time" refers to a duration of time during which at least one of two complementary MOSFETs, e.g., Q1 and Q3, or Q2 and Q4, is off (i.e., not conductive, or not activated). Dead time between complementary MOSFETs in the MOSFET bridge circuit may be provided to ensure that no short-circuits occur between upper and lower switching circuits in the bridge circuit.

In some examples herein, a dead time control circuit may include a Zener diode whose threshold voltage determines the duration of dead time intervals between complementary MOSFETs. Isolation circuitry may be included to prevent a direct electrical connection between the AC input and the DC output.

Figure 1A:
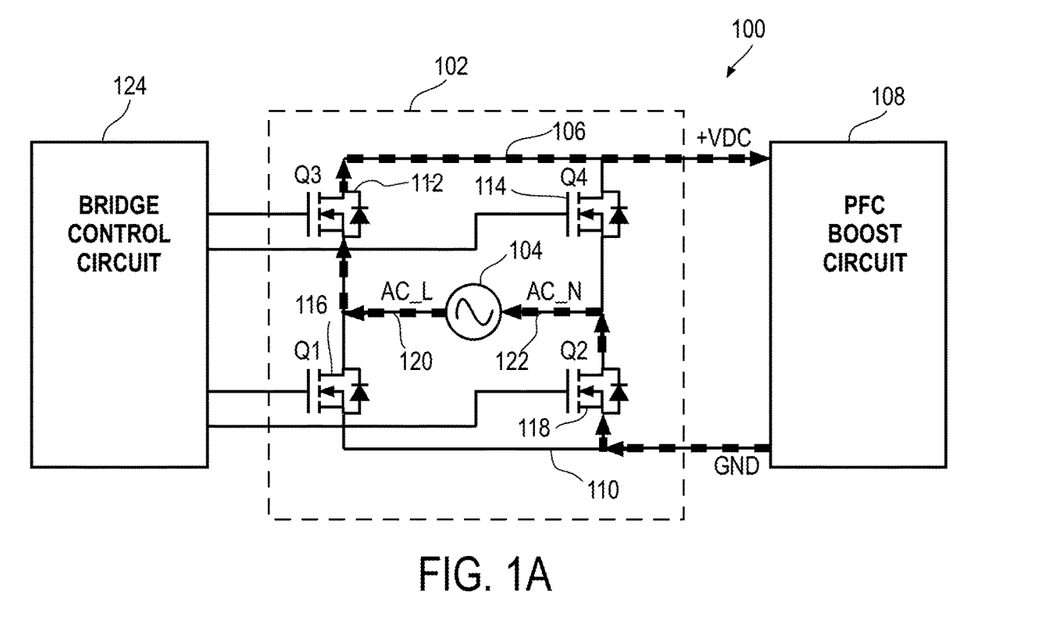
FIGS. 1A and 1B are simplified schematic diagrams illustrating a principle of operation of a bridge circuit arrangement according to one or more examples.
Figure 1B:
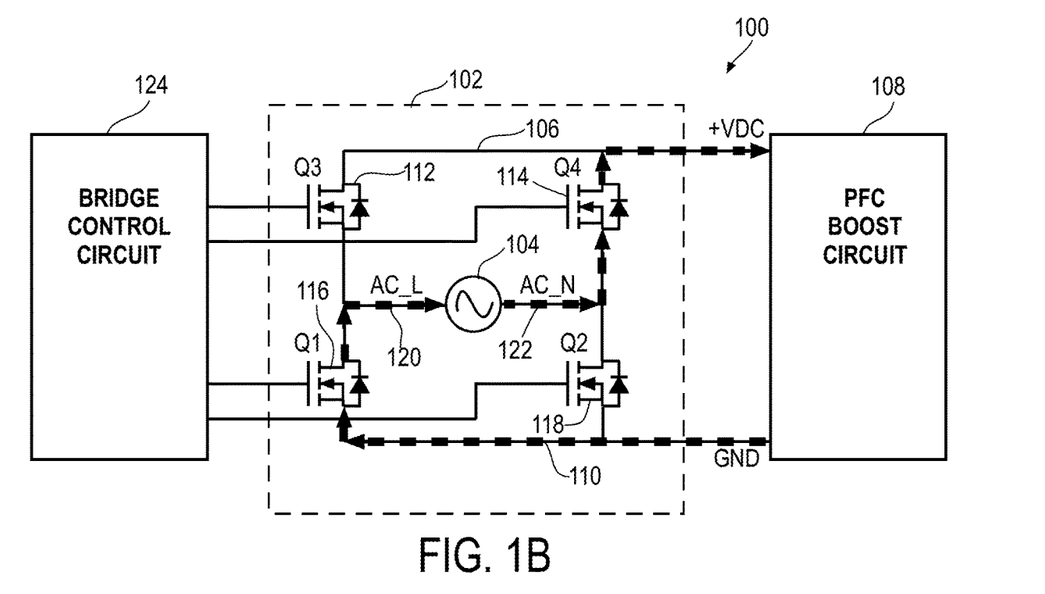

FIGS. 1A and 1B are simplified schematic diagrams illustrating a principle of operation of a bridge circuit arrangement 100 according to one or more examples. As shown in FIGS. 1A and 1B, a bridge circuit 102 converts an AC input from AC input source 104, having a line side AC_L and a neutral side AC_N, to a DC signal (+VDC) on a DC rail 106 that is provided to a load 108, which in the examples of FIGS. 1A and 1B is PFC boost circuit. The DC signal returns to bridge circuit 102 via a ground (GND) rail 110.

In examples, bridge circuit 102 includes a pair of high side bridge MOSFETs 112 (Q3) and 114 (Q4), and a pair of low side bridge MOSFETs 116 (Q1) and 118 (Q2). In some examples, bridge MOSFETs 112-118 (Q1, Q2, Q3 and Q4) are N-type enhancement mode MOSFETs. As shown in FIGS. 1A and 1B, AC source 104 includes a line side 120 (AC_L), corresponding to the positive phase of the AC signal from AC source 104, and a neutral side 122 (AC_N), corresponding to the negative phase of the AC signal from AC source 104.

In various examples, a bridge control circuit 124 is electrically coupled to each bridge MOSFET 112-118 (Q1, Q2, Q3, and Q4) to provide gate signals for controlling the switching operation of bridge circuit 102 as described herein. In particular, FIG. 1A illustrates the switching arrangement achieved during the line (positive AC voltage) phase of the AC signal from AC source 104. As shown by the dashed arrows in FIG. 1A, during the line phase, current from AC source 104 is conducted from AC_L side 120, through bridge MOSFET 112 (Q3), and on DC rail 106 to the PFC boost circuit 108. From PFC boost circuit 108, current returns to GND rail 110, through low side bridge MOSFET 118 (Q2), and through neutral side 122 (AC_N) to AC source 104. The current path illustrated in FIG. 1A is achieved through appropriate switching of bridge MOSFETs 112-118 (bridge MOSFETs 112 and 118 (Q3 and Q2) to be switched on, i.e., conductive, and bridge MOSFETs 114 and 116 (Q1 and Q4) to be switched off, i.e., not conductive.

During the neutral phase, on the other hand, illustrates the switching arrangement achieved during the neutral (negative AC voltage) phase of the AC signal from AC source 104. As shown by the dashed arrows in FIG. 1A, during the neutral phase, current from AC source 104 is conducted from AC_N side 122, through bridge MOSFET 114 (Q4), and on DC rail 106 to the PFC boost circuit 108. From PFC boost circuit 108, current returns to GND rail 110, through low side bridge MOSFET 116 (Q1), and through line side 120 (AC_L) to AC source 104. Again, the current path illustrated in FIG. 1B is achieved through appropriate switching of bridge MOSFETs 112-118 (bridge MOSFETs 114 and 116 (Q1 and Q4) to be switched on, i.e., conductive, and bridge MOSFETs 112 and 118 (Q2 and Q3) to be switched off, i.e., not conductive.

Figure 2:
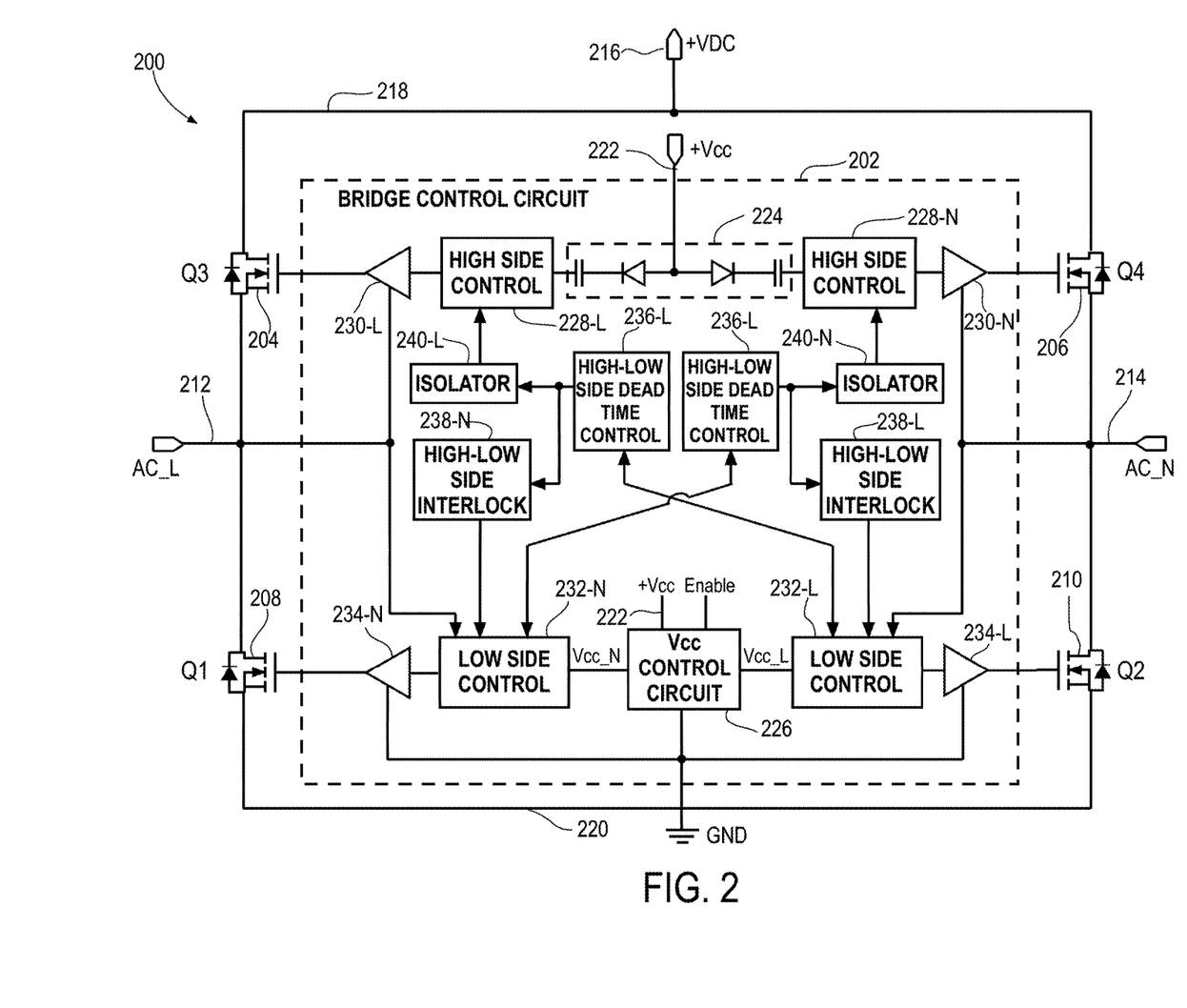
FIG. 2 is a block diagram illustrating a MOSFET bridge circuit according to one or more examples.

FIG. 2 is a block diagram of a bridge circuit 200 including a bridge control circuit 202 and a plurality of bridge MOSFETs 204 (Q3), 206 (Q4), 208 (Q1) and 210 (Q2) according to one or more examples. Bridge circuit 200 is suitable for implementation in a bridge circuit arrangement such as bridge circuit arrangement 100 illustrated in FIGS. 1A-B. As further illustrated in FIG. 2, bridge circuit 200 is coupled to a line side (AC_L) 212 of an AC source and a neutral side (AC_N) 214 of an AC source.

In the example of FIG. 2, bridge MOSFETs 204 (Q3) and 206 (Q4) are high side bridge MOSFETs, and bridge MOSFETs 206 (Q1) and 208 (Q2) are low side bridge MOSFETs. Bridge control circuit 202 selectively provides gate voltage signals to bridge MOSFETs 204 (Q3), 206 (Q4), 208 (Q1) and 210 (Q2) to enable bridge circuit 200 to produce a DC output signal (+VDC) 216 on a DC rail 218 of bridge circuit 200. Bridge circuit 200 further includes a ground rail 220.

With continued reference to FIG. 2, a low-voltage DC supply (Vcc) 222 is provided to a bootstrap circuit 224 and to a Vcc control circuit 226 in bridge control circuit 202. A pair of high side control circuits 228-L and 228-N provide gate voltage signals to high side bridge MOSFETs 204 (Q3) and 206 (Q4), respectively, via a pair of high side gating switches 230-L and 230-N, respectively. High side gating switch 230-L references the ground connection of high side control 228-L to line side AC input 212 (AC_L), while high side gating switch 230-N references the ground connection of high side control 228-N to neutral side AC input 214 (AC_N). High side control 228-L provides a gate voltage signal to high side bridge MOSFET 204 (Q3) during line phases of the AC source (AC_L), while high side control 228-N provides a gate voltage signal to high side bridge MOSFET 206 (Q4) during neutral phases of the AC source (AC_N).

Similarly, a pair of low side control circuits 232-N and 232-L provide gate voltage signals to low side bridge MOSFETs 208 (Q1) and 210 (Q2), respectively, via a pair of low side gating switches 234-N and 234-L, respectively. Low side gating switch 234-N references the ground connection of low side control 228-N directly to ground (GND), while low side gating switch 230-N references the ground connection of low side control 228-N directly to ground (GND). Low side control circuit 232-N provides a gate voltage signal to low side bridge MOSFET 208 (Q1) during neutral phases of the AC source (AC_N), while low side control circuit 232-L provides a gate voltage signal to low side bridge MOSFET 210 (Q2) during line phases of the AC input (AC_L). As described herein, the gate voltage signals from high side controls 228-L and 228-N, and low side controls 232-L and 232-N are timed to enable bridge circuit 200 to generate +VDC output 216 on DC rail 218 from line AC input (AC_L) 212 and neutral AC input (AC_N) 214).

According to one or more examples, bridge control circuit 202 further includes high-low side dead time control circuits 236-L and 236-N for establishing a dead time interval between gate voltage signals generated by high side controls 228-L, 228-N and low side controls 232-L, 232-N, as herein described. In addition, bridge control circuit 202 may include high-low side interlock circuits 238-L and 238-N to ensure that when either high side bridge MOSFET 204 (Q3) or high side bridge MOSFET 206 (Q4) is activated (turned on), low side bridge MOSFETs 208 (Q1) and 210 (Q2) are immediately deactivated (turned off).

Bridge control circuit 202 may further include isolator circuits 240-L and 240N for preventing direct electrical connection between DC rail 218 and the line side AC input 212 (AC_L) and neutral side AC input 214 (AC_N). In examples, isolator circuits may include opto-isolator components.

Figure 3:
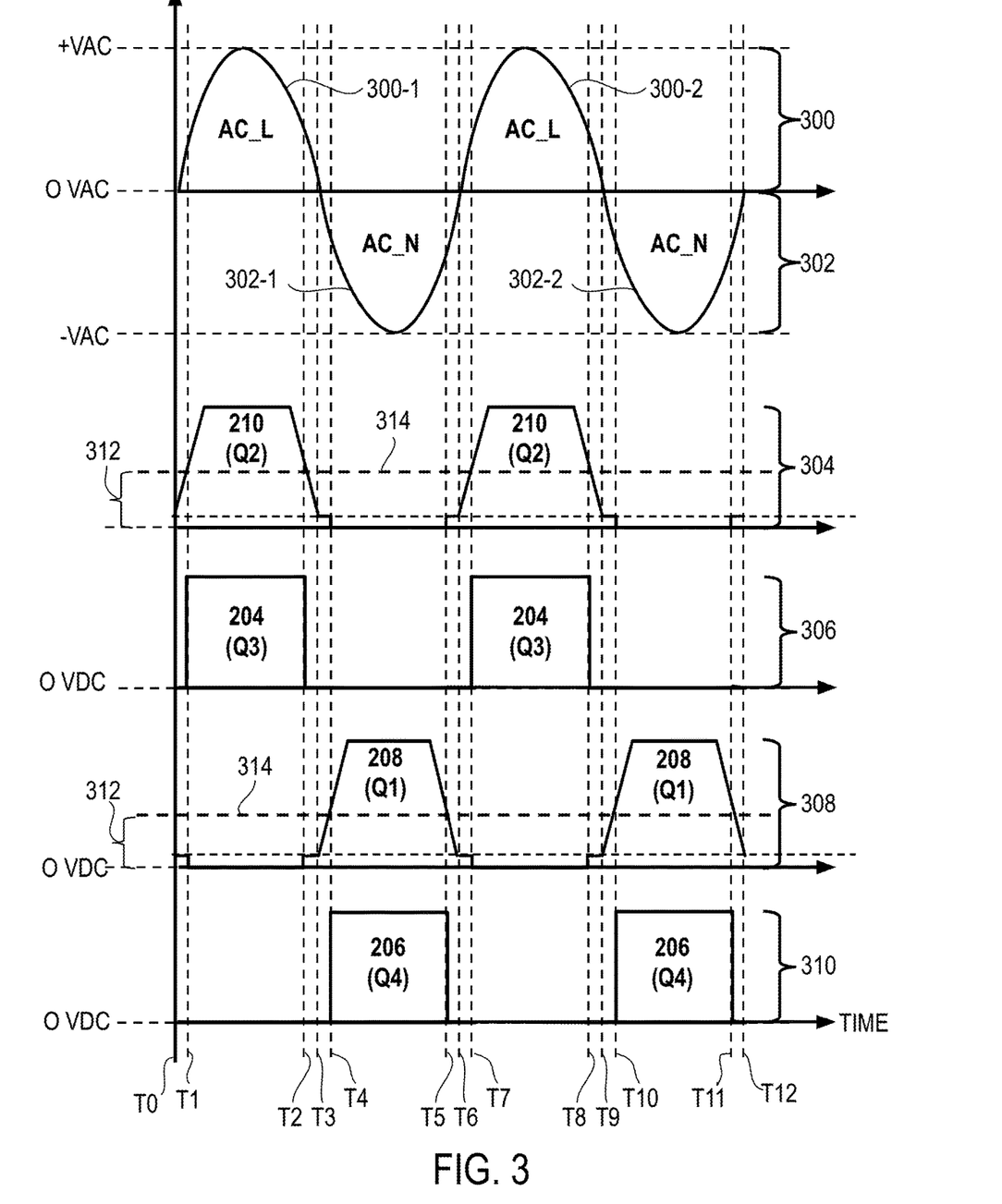
FIG. 3 is a plot of AC and gate voltage waveforms during operation of the MOSFET bridge circuit of FIG. 2.

FIG. 3 is a timing diagram illustrating signal timing in bridge circuit 200 from the example of FIG. 2 and according to one or more examples. In FIG. 3, an AC signal includes a half-sinusoidal line phase (positive AC voltage) region 300 and a half-sinusoidal neutral phase (negative AC voltage) region 302. FIG. 3 shows a first line side phase 300-1 (AC_L) extending from time T0 to time T3, followed by a first neutral phase 302-1 (AC_N) extending from time T3 to time T6, a second line phase 300-2 (AC_L) extending from time T6 to time T9, and a second neutral phase 302-2 (AC_N) extending from time T9 to time T12.

Waveform 304 in FIG. 3 represents the gate signal voltage to bridge MOSFET 210 (Q2) generated by low side control 232-L in the example of FIG. 2 during line phases (AC_L) of the AC input (waveform 300). Waveform 306 in FIG. 3 represents the gate voltage signal to bridge MOSFET 204 (Q3) generated by high side control 228-L in the example of FIG. 2 during line phases (AC_L) of the AC input (waveform 300). Waveform 308 in FIG. 3 represents the gate voltage signal to bridge MOSFET 208 (Q1) generated by low side control 232-N during neutral phases (AC_N) of AC input (waveform 302). Waveform 310 in FIG. 3 represents the gate voltage signal to bridge MOSFET 206 (Q4) by high side control 228-N during neutral phases (AC_N) of the AC input (waveform 302).

In some examples, as illustrated in FIG. 3, waveforms 304 and 308 consist of alternating gate voltage signals s having sloped rising and falling edges. The sloped rising and falling edges of the gate voltages signals in waveforms 304 and 308 are generated by low side controls 232-L and 232-N, respectively, generating low side gate voltage signals based on a Vcc_L driving voltage from Vcc control circuit 226 in the example of FIG. 2, that are referenced off of the AC_L input 212 and AC_N input 214, respectively, as herein described with reference to FIGS. 4 and 5. The sloped rising and falling edges of the gate voltage signals in waveforms 304 and 308 contribute to the establishment of dead time intervals between assertion of high side and low side bridge MOSFETs as herein described in further detail.

In some examples, as illustrated in FIG. 3, waveforms 306 and 310 consist of gate voltage signals having substantially instantaneous rising and falling edges. These rising and falling edges of waveforms 306 and 310 are generated through operation of high-low side interlocks 238-L and 238-N, such that when a high side bridge MOSFET 204 (Q1) or 206 (Q2) is turned on, the corresponding low side bridge MOSFET 210 (Q4) or 208 (Q3), respectively, will be turned off immediately.

As further illustrated in FIG. 3, dead time intervals may be established between activation of high side bridge MOSFETs 204 and 206 and activation of low side bridge MOSFETs 210 and 208, in order to avoid short circuits during transitions between line phases and neutral phases of the AC input, as noted above. For example, a first dead time interval is established between times T3 and T4, between deactivation of low side bridge MOSFET 210 (Q2) at time T3 in waveform 308 and activation of high side bridge MOSFET 206 (Q4) at time T4 in waveform 310. This dead time is established due to the sloped edge of the gate voltage signal for bridge MOSFET 208 (Q1) not exceeding a threshold of Zener diode 418 sufficient to cause activation of high side bridge MOSFET 206 (Q4) for a dead time interval based on the sloped rising edge of the gate driving signal for bridge MOSFET 208 (Q1) beginning at time T3.

Similarly, the sloped falling edge of the gate voltage signal for low side bridge MOSFET 208 (Q1) ensures that the gate voltage signal for high side bridge MOSFET 206 (Q4) is deactivated at time T5, leaving a dead time between times T5 and T6 before activation of low side bridge MOSFET 210 at time T6. The dead times are established through operation of high-low side dead time control circuits 236-L and 236-N in the example of FIG. 2, as herein described with reference to FIG. 4. Similar dead time intervals are established between each successive transition between line phases and neutral phases of the AC input.

In examples, the dead time intervals may be varied according to the reverse-bias threshold value of a Zener diode included in high-low dead time control circuits 236-L and 236-N, as herein described with reference to FIG. 4. In particular, with reference to waveforms 304 and 306 in FIG. 3, the reverse-bias threshold value of a Zener diode in high-low dead time control circuit 236-L determines the magnitude 312 of the threshold value (dashed line 314 in FIG. 3) for which low side gate voltage signal waveform 304 causes high side gate signal voltage in waveform 306 to shut off, at time T2. Likewise, the threshold value of a Zener diode in high-low dead time control circuit 236-N determines the magnitude 312 of the threshold value (dashed line 314 in FIG. 3) for which low side gate voltage signal waveform 308 causes the high side gate voltage signal in waveform 310 to immediately shut of, at time T5.

Figure 4:
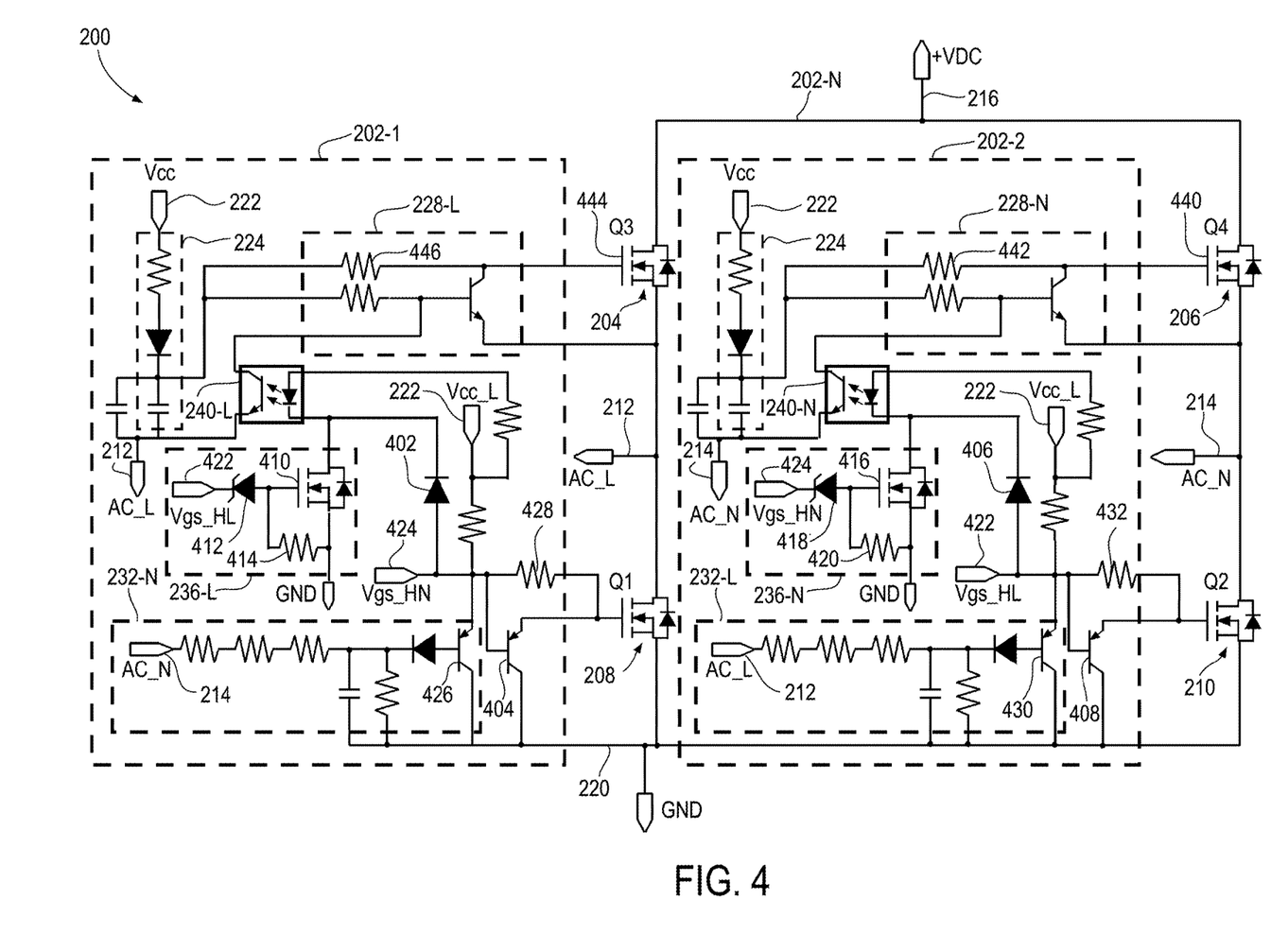
FIG. 4 is a schematic diagram illustrating an example circuit implementing the MOSFET bridge circuit of FIG. 2.

FIG. 4 is a schematic diagram of a circuit implementing bridge circuit 200 described herein with reference to FIG. 2. Elements of FIG. 4 which correspond to those of FIG. 2 retain identical reference numerals. In FIG. 4, bridge control circuit 202 is subdivided into a first bridge control subcircuit 202-1 and a second bridge control subcircuit 202-2.

In particular, FIG. 4 shows example implementations of high side control circuits 228-L and 228-N, low side control circuits 232-L and 232-N, high-low dead time control circuits 236-L and 236-N, high-low side interlocks 238-L and 238-N, and isolators 240-L and 240-N, along with bridge MOSFETs 204 (Q3), 206 (Q4), 208 (Q1) and 210 (Q2), and line side 212 (AC_L) and neutral side 214 (AC_N) of an AC input. In FIG. 4, high-low side interlock 238-L comprises a diode 402 and a BJT 404, and high-low side interlock 238-N comprises a diode 406 and a BJT 408.

As shown in FIG. 4, high-low side dead time control 236-L in first bridge control subcircuit 202-1 includes a MOSFET 410, a Zener diode 412, and a resistor 414, while high-low side dead time control 236-N includes a MOSFET 416, a Zener diode 418, and a resistor 420. A terminal 422 of Zener diode 412 in high-low side dead time control 236-L (labeled Vgs_HL in FIG. 4) is coupled to a terminal 422 (also labeled Vgs_HL) in neutral side portion 202-N of bridge control circuit 202 coupled to low side control 232-L, while terminal 424 of Zener diode 418 in high-low side dead time control 236-N (labeled Vgs_HN in FIG. 4) in second bridge control subcircuit 202-2 is coupled to terminal 424 (also labeled Vgs_HN) in first bridge control subcircuit 202-1.

With continued reference to FIG. 4, bridge control subcircuit 202-1 further includes a low side control circuit 232-N, and bridge control subcircuit 202-2 further includes a low side control circuit 232-L, which operate to provide gate voltage signals to low side bridge MOSFETs Q1 and Q2, respectively, as well as to provide feedback signals for application to high side control circuits 228-N and 228-L, respectively, as hereinafter described. Low side control circuit 232-N provides a gate voltage signal to bridge MOSFET 208 (Q1) from an emitter of a bipolar junction transistor 426 via a gate driving resistor 428, as herein described with reference to FIG. 5A. Low side control circuit 232-L provides a gate voltage signal to bridge MOSFET 210 (Q2) from an emitter of a bipolar junction transistor 430 via a gate driving resistor 432, as hereinafter described with reference to FIG. 5B.

Figure 5A:
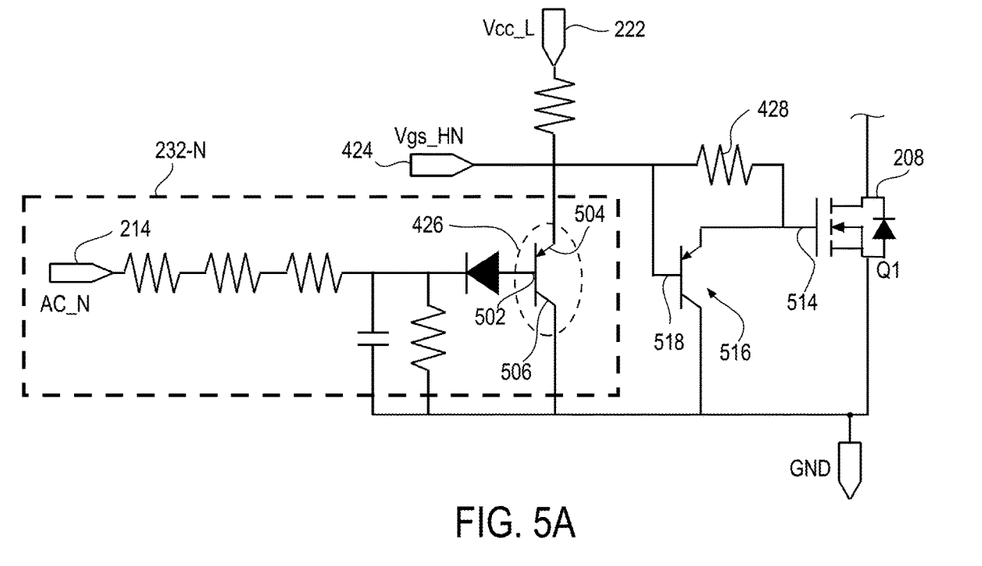
FIG. 5A is a schematic diagram of a portion of the example of FIG. 4 including a first low side control and a first low side bridge MOSFET.
Figure 6A:
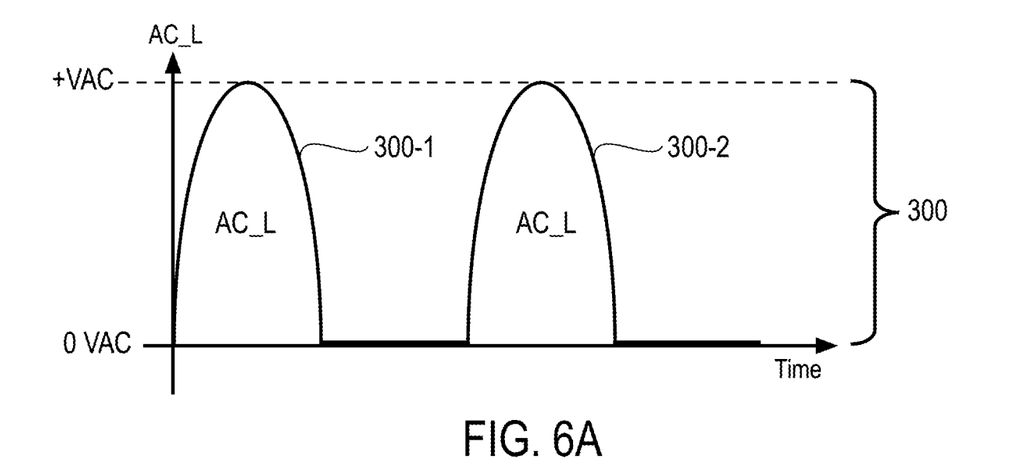
FIG. 6A is a plot of a line side half sinusoidal phase of an AC input signal.
Figure 6B:
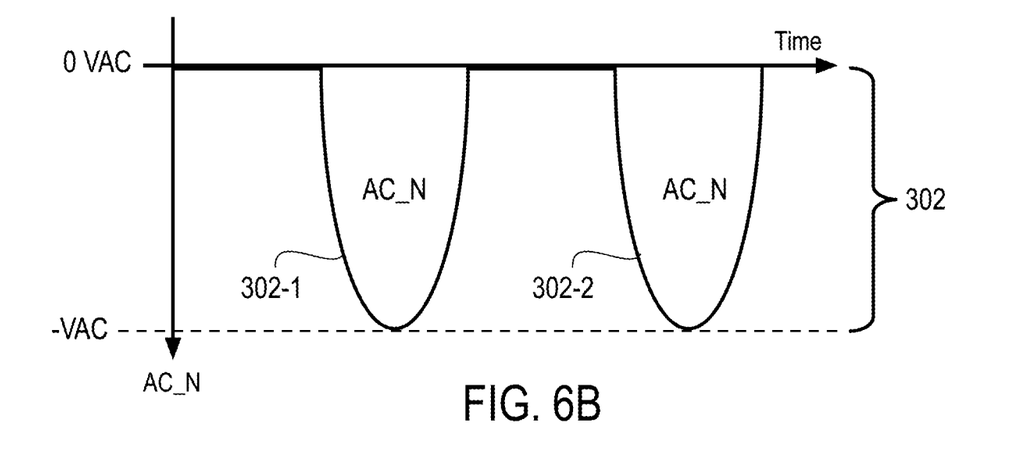
FIG. 6B is a plot of a neutral side half sinusoidal phase of an AC input signal.

FIG. 5A is a portion of bridge control subcircuit 202-1 including low side control 232-N, low side bridge MOSFET 208 (Q1), bipolar junction transistor 426 and gate driving resistor 428. Bipolar junction transistor 426 feeds back the neutral side AC input voltage 214 (AC_N) on a base terminal identified with reference numeral 502 in FIG. 5A, while a fixed supply voltage Vcc_L is applied to an emitter terminal identified with reference numeral 504 in FIG. 5A. A collector terminal 506 of bipolar junction transistor 426 is coupled to ground (GND). The neutral side AC input voltage on terminal 214 (AC_N) applied to base terminal 502 of bipolar junction transistor 426, is the half-sinusoidal sinusoid waveform 302 from FIG. 3, as also shown in FIG. 6B.

Figure 5B:
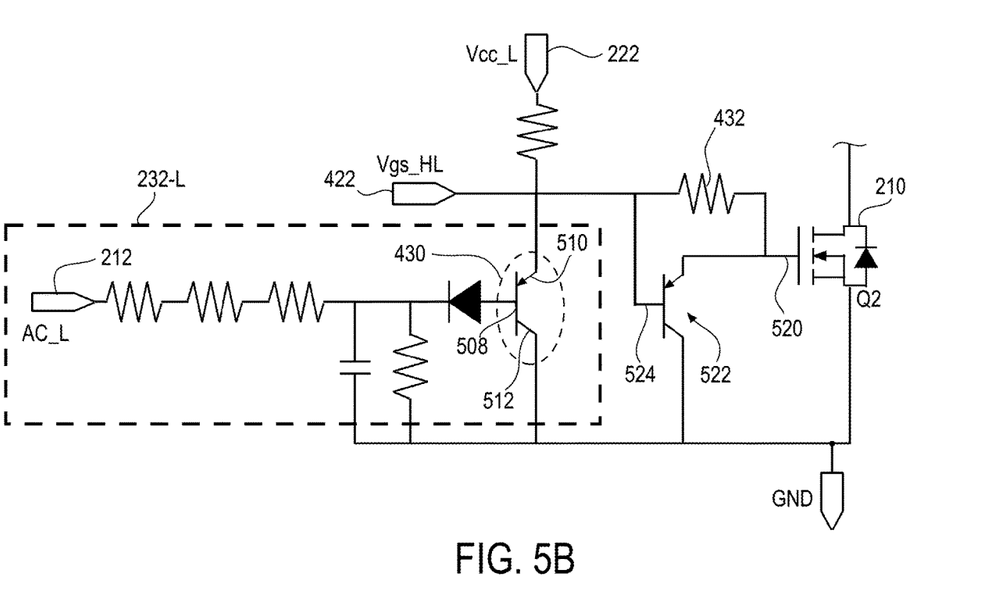
FIG. 5B is a schematic diagram of a portion of the example of FIG. 4 including a second low side control and a second low side bridge MOSFET.

Similarly, FIG. 5B is a portion of bridge control subcircuit 202-2 including low side control 232-L, low side bridge MOSFET 208 (Q2), bipolar junction transistor 430 and gate driving resistor 432. Bipolar junction transistor 430 feeds back the line side AC input voltage 212 (AC_L) on a base terminal identified with reference numeral 508 in FIG. 5B, while a fixed supply voltage Vcc_L is applied to an emitter terminal identified with reference numeral 510 in FIG. 5A. A collector terminal 512 of bipolar junction transistor 426 is coupled to ground (GND). The line side AC input voltage on terminal 212 (AC_L) applied to base terminal 508 of bipolar junction transistor 430, is the half-sinusoidal sinusoid waveform 300 from FIG. 3, as also shown in FIG. 6A.

Figure 7:
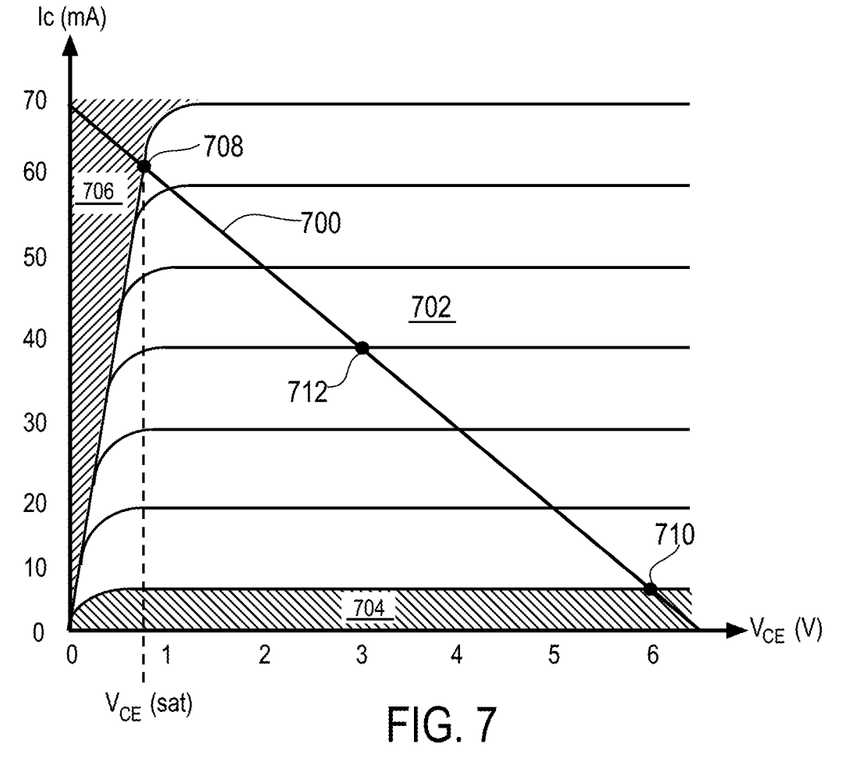
FIG. 7 is a current-voltage plot of operation of a bipolar transistor in a low side control circuit from the example of FIG. 4.

FIG. 7 is a plot of collector current $I_c$ (vertical axis) versus collector-to-emitter voltage $V_{CE}$ (horizontal axis) in bipolar junction transistor 426 during neutral phase (waveform 302 in FIG. 3). Line 700 indicates the operating range of bipolar junction transistor 426. As shown in FIG. 7, and in response to the sinusoidal waveform of the neutral side AC input voltage on terminal 214 (AC_N), bipolar junction transistor 426 will have an active region 702, a cut-off region 704, and a saturation region 706. At point 708 in FIG. 7, bipolar junction transistor 426 enters saturation region 706, where the collector-to-emitter voltage $V_{CE}$ is at a maximum. At point 710 in FIG. 7, bipolar junction transistor 426 enters cut-off region 704, where collector current $I_C$=0 AND $V_{CE}$=$V_{CC\_L}$, the voltage applied to the emitter as shown in FIGS. 2 and 4. Point 712 of operating range 700 represents an example operating condition of bipolar junction transistor 426 in active region 702.

In cut-off region 704 of FIG. 7, bipolar junction transistor 426 is fully off. In saturation region 706 of FIG. 7, bipolar junction transistor 426 is fully on. In active region 702 of FIG. 7, bipolar junction transistor 426 operates as the equivalent of a variable resistor to produce the sloped rising and falling edges of low side gate signal voltage waveforms 304 and 306 shown in FIG. 3, as herein described.

Figure 8:
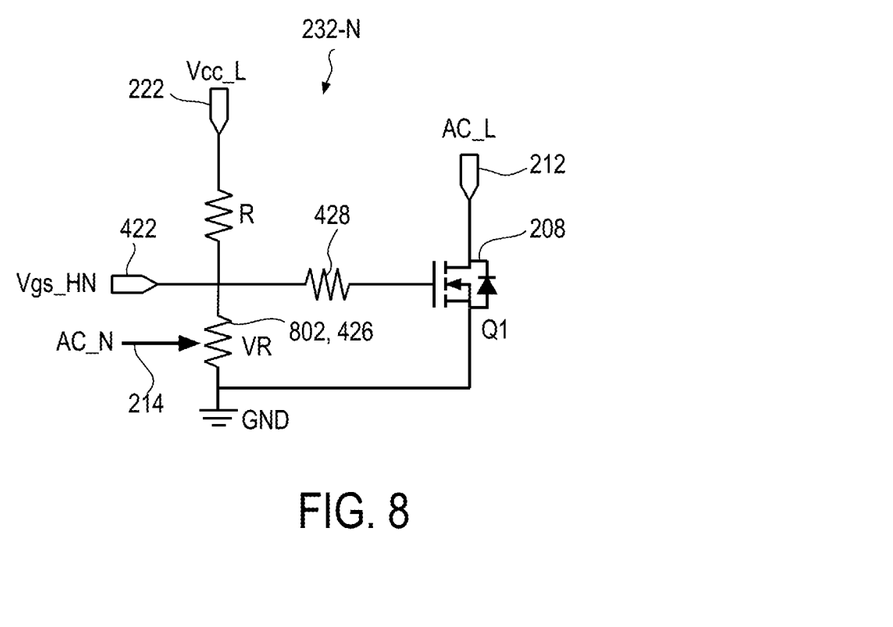
FIG. 8 is a schematic diagram of an equivalent circuit corresponding to a low side control circuit from the example of FIG. 4.

FIG. 8 is a schematic diagram of an equivalent circuit representing operation of bipolar junction transistor 426 in active region 702 of FIG. 7. As illustrated in FIG. 8, bipolar junction transistor 426 operates as a variable resistor VR 802 for varying the gate voltage signal Vgs_HN at terminal 424, through gate driving resistor 428, to provide sloped rising and falling edges of gate voltage signal (waveform 308 in FIG. 3) to low side bridge MOSFET 208 (Q1), coupled between ground (GND) and line input AC_L (terminal 212).

The equivalent circuit for operation of bipolar junction transistor 430 in low side control 232-L is the same as illustrated in FIG. 8, except that the gate voltage signal Vgs_HL at terminal 422 is applied through gate driving resistor 432 to low side bridge MOSFET 210 (Q2) coupled between ground (GND) and AC_N 214.

With reference to FIGS. 4, 5A and 5B, in operation, gate driving voltage Vcc_L on terminal 222 is provided for low side controls 232-N and 232-L. In low side control 232-N, driving voltage Vcc_L is selectively applied to a gate terminal 514 of bridge MOSFET 208 (Q1) through gate driving resistor 428 depending upon the conductivity of a bipolar junction transistor 516 coupled between gate terminal 514 and ground (GND). In examples, the circuitry of low side control 232-N operates as the equivalent of a variable resistor responsive to the half-sinusoidal input voltage AC_N (shown in FIG. 6B) applied to terminal 214 of low side control 232-N. The control output of low side control 232-N appears at terminal 424 (Vgs_HN) as well as being applied a base terminal 518 of bipolar junction transistor 516. The half-sinusoidal form of AC_N input 214 to low side control 232-N, and the operation of low side control 232-N as the equivalent of a variable resistor as described with reference to FIG. 8, result in the gate voltage signal Vgs_HN (terminal 424) applied to gate 514 of bridge MOSFET 208 (Q1) via gate driving resistor 428 having the sloped rising and falling edges as illustrated in waveform 308 of FIG. 3.

Similarly, in low side control 232-L, driving voltage Vcc_L is selectively applied to a gate terminal 520 of bridge MOSFET 210 (Q2) through gate driving resistor 432 depending upon the conductivity of a bipolar junction transistor 522 coupled between gate terminal 520 and ground (GND). In examples, the circuitry of low side control 232-L operates as the equivalent of a variable resistor responsive to the half-sinusoidal input voltage AC_L (shown in FIG. 6A) applied to terminal 212 of low side control 232-L. The control output of low side control 232-L appears at terminal 422 (Vgs_HNL) as well as being applied a base terminal 524 of bipolar junction transistor 522. The half-sinusoidal form of AC_L input 212 to low side control 232-L, and the operation of low side control 232-L as the equivalent of a variable resistor as described with reference to FIG. 8, result in the gate voltage signal Vgs_HL (terminal 422) applied to gate 520 of bridge MOSFET 208 (Q2) via gate driving resistor 432 having the sloped rising and falling edges as illustrated in waveform 304 of FIG. 3.

In addition to turning low side bridge MOSFETs Q1 and Q2 on and off as described herein, the sloped gate voltage signals Vgs_HN and Vgs_HL (terminals 424 and 422, respectively) generated by low side controls 232-N and 232-L, respectively, are coupled to complementary dead time control circuits 236-N and 236-L, respectively, in order to establish dead times between high side and low side bridge MOSFETS Q3/Q4 and Q1/Q2.

In particular, referring to FIG. 4, the low side gate voltage signal Vgs_HN (terminal 424) produced by low side control 232-N in bridge control sub-circuit 202-1 and provided to low side bridge MOSFET 208 (Q1) is also coupled to dead time control 236-N in bridge control sub-circuit 202-2. As shown in FIG. 4, low side gate voltage signal Vgs_HN (terminal 424) is applied to reverse bias Zener diode 418 providing a control signal to MOSFET 416. Only when the sloped edge of low side gate voltage signal Vgs_HN is sufficient to overcome the reverse bias threshold of Zener diode 418 will MOSFET 416 be turned on, thereby enabling high side control 228-N to apply a high side gate voltage signal (from Vcc terminal 222) to a gate terminal 440 of high side bridge MOSFET 206 (Q4) via a gate driving resistor 442. The delay in the sloped rising edge of low side gate voltage signal Vgs_HN (terminal 424) overcoming the threshold voltage of Zener diode 418 in dead time control 236-N establishes a dead time (between times T3 and T4 as illustrated in FIG. 3) between conduction by low side bridge MOSFET 208 (Q1) and conduction by high side bridge MOSFET 206 (Q4).

Further, the sloped falling edge of low side gate voltage signal Vgs_HN falls below the reverse bias threshold of Zener diode 418, dead time control 236-N functions to prevent application of the gate driving voltage from Vcc terminal 222 to gate terminal 440 of high side bridge MOSFET 206 (Q4). This likewise establishes a dead time between turning off high side bridge MOSFET 206 (Q4) (at time T5 in FIG. 3) and turning off low side bridge MOSFET 208 (Q1) (at time T6 in FIG. 3).

Similarly, and with continued reference to FIG. 4, the low side gate voltage signal Vgs_HL (terminal 422) produced by low side control 232-L in bridge control sub-circuit 202-2 and provided to low side bridge MOSFET 210 (Q2) is also coupled to dead time control 236-L in bridge control sub-circuit 202-1. As shown in FIG. 4, low side gate voltage signal Vgs_HL (terminal 422) is applied to reverse bias Zener diode 412 providing a control signal to MOSFET 410. Only when the sloped edge of low side gate voltage signal Vgs_HL is sufficient to overcome the reverse bias threshold of Zener diode 412 will MOSFET 410 be turned on, thereby enabling high side control 228-L to apply a gate driving signal (from Vcc terminal 222) to a gate terminal 444 of high side bridge MOSFET 206 (Q4) via a gate driving resistor 446. The delay in the sloped rising edge of low side gating signal Vgs_HL (terminal 422) overcoming the threshold voltage of Zener diode 412 in dead time control 236-L establishes a dead time (between times T6 and T7 as illustrated in FIG. 3) between conduction by low side bridge MOSFET 210 (Q2) and conduction by high side bridge MOSFET 204 (Q3).

Further, the sloped falling edge of low side gate voltage signal Vgs_HL falls below the reverse bias threshold of Zener diode 412, dead time control 236-L functions to prevent application of the gating signal from Vcc terminal 222 to gate terminal 444 of high side bridge MOSFET 204 (Q3). This likewise establishes a dead time between turning off high side bridge MOSFET 204 (Q3) (at time T8 in FIG. 3) and turning off low side bridge MOSFET 210 (Q2) (at time T9 in FIG. 3).

As noted, each bridge control sub-circuit 202-1 and 202-2 includes circuitry implementing high-low side interlock circuits 238-N and 238-L as illustrated in FIG. 2. In particular, in FIG. 4, high-low side interlock 238-L comprises a diode 402 and a BJT 404, and high-low side interlock 238-N comprises a diode 406 and a BJT 408.

Referring to bridge control sub-circuit 202-1 in FIG. 4, high-low side interlock circuitry including diode 402 and BJT 404 operates as the equivalent of a Boolean "NOT" gate, such that when high side bridge MOSFET Q3 is enabled, the gate voltage on low side bridge MOSFET Q1 is pulled low immediately. That is, when high side gate voltage signal Vgs_HL (terminal 422) is high enough to turn on MOSFET 410 of dead time control circuit 236-L, current flows through diode 402 so that the gate voltage of bridge MOSFET 208 (Q1) will be pulled to low. BJT 404 increases the turn-off speed for turn-off of bridge MOSFET 208 (Q1).

The following Table 1 illustrates this operation for high-low side interlock circuitry 238-N as implemented in bridge control sub-circuit 202-1:

TABLE 1

| Vgs_HL (terminal 422) | Vgs_HN (terminal 424) | Gate voltage of bridge MOSFET 208 (Q1) |
|---|---|---|
| 1 | 0 | 0 |
| 0 | 1 | 1 |

As illustrated in FIG. 4, BJT 404 is configured such that when high side gate voltage signal Vgs_HL is high, BJT 404 turns on, immediately coupling gate 514 of low side bridge MOSFET 208 (Q1) to ground.

Operation of high-low side interlock circuit 236-N in bridge control subcircuit 202-2, consisting of diode 406 and BJT 408 is identical, with the signals Vgs_HL and Vgs_HN (terminals 422 and 424) reversed and the gate voltage being that of low side bridge MOSFET 210 (Q2) rather than low side bridge MOSFET 208 (Q1).

Figure 9:
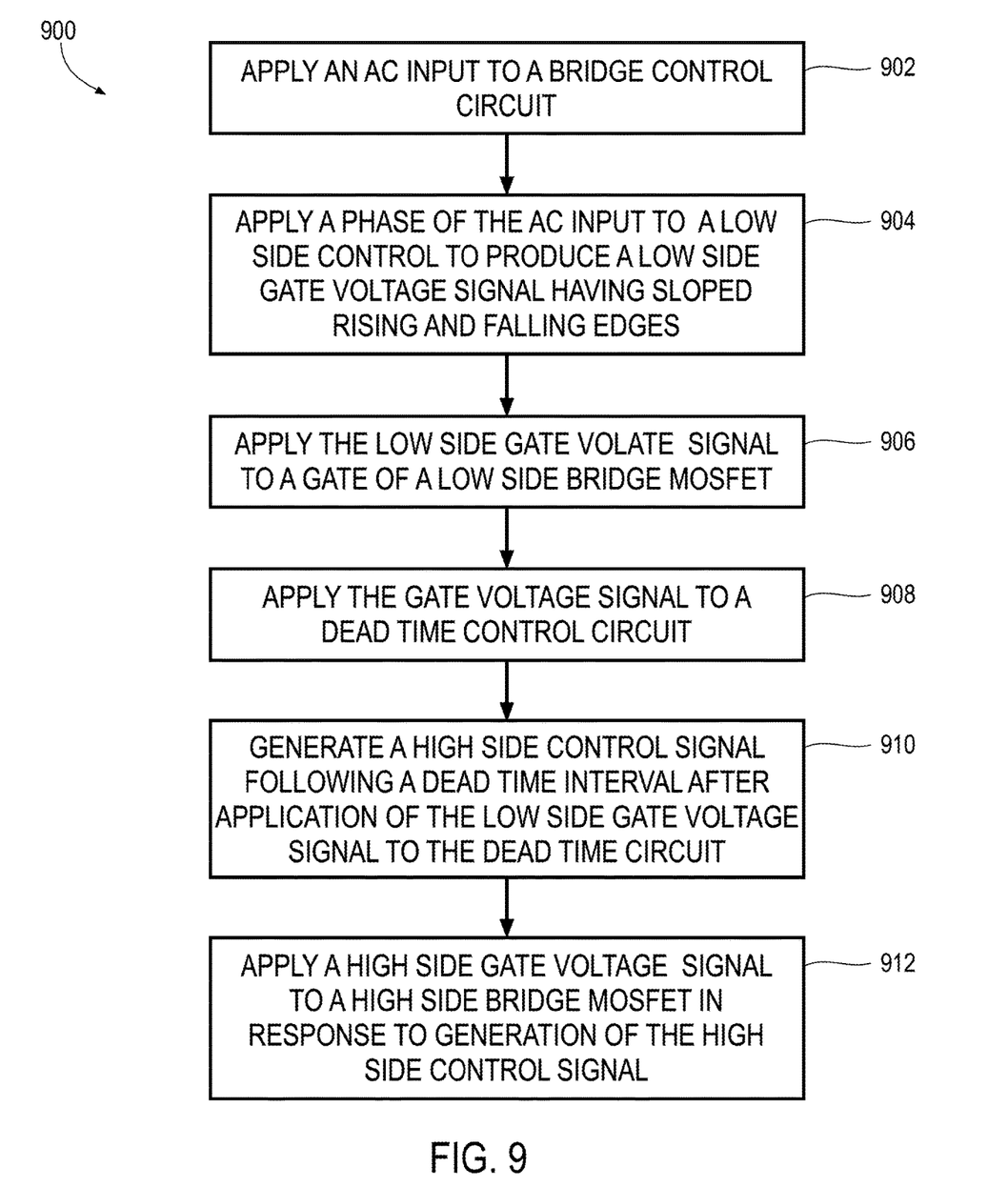
FIG. 9 is a flow diagram of a method of operating a bridge circuit according to one or more examples.

FIG. 9 is a flow diagram of a method 900 of operating of bridge control circuit 202 from FIG. 2, consisting of bridge control sub-circuits 202-1 and 202-2 as illustrated in FIGS. 4, 5A and 5B. First, as represented by block 902 in FIG. 9, an AC input is applied to the bridge control circuit. In examples, block 902 of method 900 comprises applying a line phase of the AC input to bridge control sub-circuit 202-1 and a neutral phase of the AC input to bridge control sub-circuit 202-2.

Next, in block 904, a phase of the AC input (either a line phase or a neutral phase) is applied to a low side control to produce a low side gate voltage signal having sloped rising and falling edges. In the example of FIGS. 2, 4, 5A and 5B, this is illustrated by low side control 232-N producing gate voltage signal Vgs_HN at terminal 424, and by low side control 232-L producing gating signal Vgs_HL at terminal 422.

In block 906, the low side gating signal having sloped rising and falling edges is applied to a gate of a low side bridge MOSFET. In the example of FIGS. 4, 5A, and 5B this is illustrated by low side control 232-N applying the gate driving signal on terminal 222 (Vcc_L) to gate terminal 514 of low side bridge MOSFET 208 (Q1) via gating resistor 428, and by low side control 232-L applying the gate driving signal on terminal 222 (Vcc_L) to gate terminal 520 of low side bridge MOSFET 210 (Q2) via gating resistor 432.

In block 908, the low side gate voltage signal generated in block 904 is applied to a dead time control circuit. In the example of FIGS. 4, 5A, and 5B, this is illustrated by gating signal Vgs_HN at terminal 424 in bridge control sub-circuit 202-1 being provided to dead time control 236-N in bridge control sub-circuit 202-2, and by gate voltage signal Vgs_HL at terminal 422 in bridge control sub-circuit 202-2 being provided to dead time control 236-L in bridge control sub-circuit 202-1.

In block 910, high side control signal is generated following a dead time interval. In the example of FIGS. 4, 5A and 5B, this is illustrated by activation of MOSFET 410 in dead time control 236-L after gate voltage signal Vgs_HL on terminal 422 exceeds a threshold voltage of Zener diode 412, and by activation of MOSFET 416 in dead time control 236-N after gate voltage signal Vgs_HN on terminal 424 exceeds a threshold voltage of Zener diode 418.

In block 912, a high side gate driving signal is applied to a high side bridge MOSFET in response to generating of the high side control signal in block 910. In the example of FIGS. 4, 5A, and 5B, this is illustrated by application of gate driving signal on terminal 222 (Vcc) to high side bridge MOSFET 206 (Q4) via gate driving resistor 442 in response to dead time control 236-N generating a high side control signal in block 910, and by application of gate driving signal on terminal 222 (Vcc) via gate driving resistor 446 to high side bridge MOSFET 204 (Q3) in response to dead time control 236-L generating a high side control signal in block 910.

The foregoing description, for purposes of explanation, uses specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. Examples herein are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed:

1. A control circuit for a plurality of metal-oxide semiconductor field-effect transistors (MOSFETs) in a bridge circuit for rectifying an alternating current (AC) input to generate a direct-current (DC) output, the control circuit comprising:
   a first high side control for providing a first gate voltage signal to a gate of a first high side bridge MOSFET and a second high side control for providing a second gate voltage signal to a gate of a second high side bridge MOSFET, the first and second gate voltage signals for selectively switching the first and second high side bridge MOSFETs on and off;
   a first low side control for providing a third gate voltage signal to a gate of a first low side bridge MOSFET and a second low side control for providing a fourth gate voltage signal to a second low side bridge MOSFET;
   a first high-low side dead time control coupled between the first low side control and the first high side control, the first high-low side dead time control including a first Zener diode having a threshold voltage for establishing a duration of a first dead time interval between activation of the first low side bridge MOSFET and the second high side bridge MOSFET; and
   a second high-low side dead time control coupled between the second low side control and the second high side control, the second high-low side dead time control including a second Zener diode having a threshold voltage for establishing a duration of a second dead time interval between activation of the second low side bridge MOSFET and the first high side bridge MOSFET.

2. The control circuit of claim 1, wherein the third and fourth gate voltage signals have sloped rising and falling edges.

3. The control circuit of claim 2, further comprising:
   first high-low side interlock circuitry responsive to activation of the first high side bridge MOSFET to turn off the first low side bridge MOSFET; and
   second high-low side interlock circuitry responsive to activation of the second high side bridge MOSFET to turn off the second low side bridge MOSFET.

4. The control circuit of claim 3, wherein:
   the first low side control includes a bipolar junction transistor responsive to the AC input to generate the sloped rising and falling edges of the third gate voltage signal; and
   the second low side control includes a bipolar junction transistor responsive to the AC input to generate the sloped rising and falling edges of the fourth gate voltage signal.

5. The control circuit of claim 4, wherein:
   a reverse bias threshold voltage of the first Zener diode determines the duration of the first dead time interval and a reverse bias threshold of the second Zener diode determines the duration of the second dead time interval.

6. The control circuit of claim 3, wherein:
   the first high-low side interlock circuitry comprises a bipolar junction transistor responsive to assertion of the first gate voltage signal to deactivate the first low side bridge MOSFET; and
   the second high-low side interlock circuitry comprises a bipolar junction transistor responsive to assertion of the second gate voltage signal to deactivate the second low side bridge MOSFET.

7. The control circuit of claim 2, wherein:
   the first low side control is responsive to a line phase of the AC input to generate the third gate voltage signal; and
   the second low side control is responsive to a neutral phase of the AC input to generate the fourth gate voltage signal.

8. The control circuit of claim 7, wherein:
   the first high side control is responsive to the fourth gate voltage signal to generate the first gate voltage signal following the first dead time interval; and
   the second high side control is response to the third gate voltage signal to generate the second gate voltage signal following the second dead time interval.

9. A method of operating a bridge circuit, comprising:
   applying an alternating current (AC) input to the bridge control circuit, the AC input having a line phase and a neutral phase;
   applying a first one of the line phase and the neutral phase to a low side control to produce a first low side gating signal having sloped rising and falling edges;
   applying the first low side gating signal to a gate of a first low side bridge MOSFET;
   applying the first low side gating signal to a first dead time control;
   generating a first high side control signal following a first dead time interval after application of the first low side gating signal to the first dead time control; and
   applying a first high side gating signal to a first high side bridge MOSFET in response to generation of the first high side control signal.

10. The method of claim 9, further comprising:
    applying a second one of the line phase and the neutral phase to a second low side control to produce a second low side gating signal having sloped rising and falling edges;
    applying the second low side gating signal to a gate of a second low side bridge MOSFET;
    applying the second low side gating signal to a second dead time control;

generating a second high side control signal following a second dead time interval after application of the second low side gating signal to the second dead time control; and applying a second high side gating signal to a second high side bridge MOSFET in response to generation of the second high side control signal.

11. The method of claim 10, wherein:

applying the first low side gating control signal to a first dead time control comprises applying the first low side gating control signal to a terminal of a first Zener diode, a reverse bias threshold of the first Zener diode determining a duration of the first dead time interval; and applying the second low side gating control signal to a second dead time control circuit comprises applying the second low side gating control signal to a terminal of a second Zener diode, a reverse bias threshold of the second Zener diode determining a duration of the second dead time interval.

12. The method of claim 10, further comprising:

providing a first high-low side interlock for preventing activation of the first low side bridge MOSFET when the first high side bridge MOSFET is activated; and providing a second high-low side interlock for preventing activation of the second low side bridge MOSFET when the second high side bridge MOSFET is activated.

13. The method of claim 9, wherein applying a first one of the line phase and the neutral phase to a low side control to produce a first low side gating signal having sloped rising and falling edges comprises:

applying the first one of the line phase and the neutral phase to a circuit including a first bipolar junction transistor, the first bipolar junction transistor operable to produce the gate driving signal having sloped rising and falling edges.

14. A bridge circuit, comprising:

a plurality of metal-oxide semiconductor field-effect transistors (MOSFETs) in a bridge circuit for rectifying an alternating current (AC) input to generate a direct-current (DC) output;

a control circuit coupled to the plurality of MOSFETs, comprising:

a first high side control for providing a first gate voltage signal to a gate of a first high side bridge MOSFET and a second high side control for providing a second gate voltage signal to a gate of a second high side bridge MOSFET, the first and second gate voltage signals for selectively switching the first and second high side bridge MOSFETs on and off;

a first low side control for providing a third gate voltage signal to a gate of a first low side bridge MOSFET and a second low side control for providing a fourth gate voltage signal to a second low side bridge MOSFET;

a first high-low side dead time control coupled between the first low side control and the first high side control, the first high-low side dead time control including a first Zener diode having a threshold voltage for establishing duration of a first dead time interval between activation of the first low side bridge MOSFET and the second high side bridge MOSFET; and a second high-low side dead time control coupled between the second low side control and the second high side control, the second high-low side dead time control including a second Zener diode having a threshold voltage for establishing duration of a second dead time interval between activation of the second low side bridge MOSFET and the first high side bridge MOSFET.

15. The bridge circuit of claim 14, wherein the third and fourth gate voltage signals have sloped rising and falling edges.

16. The bridge circuit of claim 15, further comprising:

first high-low side interlock circuitry responsive to activation of the first high side bridge MOSFET to turn off the first low side bridge MOSFET; and second high-low side interlock circuitry responsive to activation of the second high side bridge MOSFET to turn of the second low side bridge MOSFET.

17. The bridge circuit of claim 16, wherein:

the first low side control includes a bipolar junction transistor responsive to the AC input to generate the sloped rising and falling edges of the third driving signal; and the second low side control includes a bipolar junction transistor responsive to the AC input to generate the sloped rising and falling edges of the fourth driving signal.

18. The bridge circuit of claim 17, wherein:

a reverse bias threshold voltage of the first Zener diode determines the duration of the first dead time interval and a reverse bias threshold of the second Zener diode determines the duration of the second dead time interval.

19. The bridge circuit of claim 15, wherein:

the first low side control is responsive to a line phase of the AC input to generate the third gate voltage signal; and the second low side control is responsive to a neutral phase of the AC input to generate the fourth gate voltage signal.

20. The bridge circuit of claim 19, wherein:

the first high side control is responsive to the fourth gate voltage signal to generate the first gate voltage signal following the first dead time interval; and the second high side control is responsive to the third gate voltage to generate the second gate voltage signal following the second dead time interval.

* * * * *